US008073653B2

(12) United States Patent
Suzuki et al.

(10) Patent No.: US 8,073,653 B2
(45) Date of Patent: Dec. 6, 2011

(54) COMPONENT LIFE INDICATOR

(75) Inventors: Jin Suzuki, Manchester, CT (US); David Randal Hinton, Mt. Zion, IL (US); Julie A. Gannon, Washington, IL (US); Conrad Gene Grembowicz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1312 days.

(21) Appl. No.: 10/326,410

(22) Filed: Dec. 23, 2002

(65) Prior Publication Data

US 2004/0122618 A1 Jun. 24, 2004

(51) Int. Cl.

| | |
|---|---|
| ***G06F 17/18*** | (2006.01) |
| ***G06F 11/30*** | (2006.01) |
| ***G01B 3/44*** | (2006.01) |
| ***G01B 3/52*** | (2006.01) |
| ***G21C 17/00*** | (2006.01) |

(52) U.S. Cl. .......................... 702/181; 702/34; 702/185

(58) Field of Classification Search .............. 702/33–35, 702/81, 82, 84, 179–185

See application file for complete search history.

(56) References Cited

U.S. PATENT DOCUMENTS

| | | | | |
|---|---|---|---|---|
| 4,742,476 A | | 5/1988 | Schwartz et al. | 701/30 |
| 4,847,768 A | | 7/1989 | Schwartz et al. | 701/30 |
| 4,862,393 A | | 8/1989 | Reid et al. | 701/30 |
| 5,311,562 A | * | 5/1994 | Palusamy et al. | 376/215 |
| 5,355,734 A | | 10/1994 | Kajino | 73/775 |
| 5,382,942 A | | 1/1995 | Raffa et al. | 340/457.4 |
| 5,400,018 A | | 3/1995 | Scholl et al. | 340/10.3 |
| 5,463,567 A | | 10/1995 | Boen et al. | 702/187 |
| 5,531,122 A | | 7/1996 | Chatham et al. | |
| 5,561,610 A | | 10/1996 | Schricker et al. | 702/185 |
| 5,566,091 A | | 10/1996 | Schricker et al. | 702/34 |
| 5,566,092 A | | 10/1996 | Wang et al. | 702/15 |
| 5,602,761 A | | 2/1997 | Spoerre et al. | 702/179 |
| 5,642,284 A | | 6/1997 | Parupalli et al. | 701/30 |
| 5,732,676 A | | 3/1998 | Weisman et al. | 123/436 |
| 5,737,215 A | | 4/1998 | Schricker et al. | 700/29 |
| 5,742,915 A | | 4/1998 | Stafford | |
| 5,903,474 A | | 5/1999 | Sadler et al. | 703/2 |
| 5,950,147 A | | 9/1999 | Sarangapani et al. | 702/179 |
| 5,983,198 A | | 11/1999 | Mowery et al. | 705/22 |
| 5,995,888 A | | 11/1999 | Hagenbuch | 701/35 |

(Continued)

FOREIGN PATENT DOCUMENTS

EP 0749934 12/1996

(Continued)

OTHER PUBLICATIONS

Answers.com Dictionary, 4 pages, updated 2007.*

(Continued)

*Primary Examiner* — Michael Nghiem
(74) *Attorney, Agent, or Firm* — Steve D. Lundquist

(57) ABSTRACT

A life indicator for a component of a machine is disclosed. The life indicator includes at least one sensor operably associated with the machine and configured to sense a property associated with the machine. The sensor is configured to output the sensed property as a data signal. The life indicator also includes a memory element having a first data structure that determines a damage factor for the component of the machine based at least in part on the data signal received from the at least one sensor. A processor executes the first data structure to determine the damage factor.

31 Claims, 12 Drawing Sheets

U.S. PATENT DOCUMENTS

| | | | | |
|---|---|---|---|---|
| 5,995,916 | A | 11/1999 | Nixon et al. | 702/182 |
| 6,006,171 | A | 12/1999 | Vines et al. | 702/184 |
| 6,119,074 | A | 9/2000 | Sarangapani | 702/185 |
| 6,141,629 | A | 10/2000 | Yamamoto et al. | 702/187 |
| 6,253,601 | B1 | 7/2001 | Wang et al. | 73/117.3 |
| 6,363,332 | B1 | 3/2002 | Rangarajan et al. | 702/185 |
| 6,442,511 | B1 | 8/2002 | Sarangapani et al. | 702/194 |
| 6,560,549 | B2 * | 5/2003 | Fonkalsrud et al. | 702/41 |
| 7,457,785 | B1 * | 11/2008 | Greitzer et al. | 706/12 |
| 2002/0095985 | A1 * | 7/2002 | Genise et al. | 73/162 |

FOREIGN PATENT DOCUMENTS

| | | |
|---|---|---|
| WO | WO/02/18879 | 3/2002 |
| WO | 02068310 | 9/2002 |

OTHER PUBLICATIONS

English Abstract of EP 749 934, Dec. 27, 1996.*

* cited by examiner

COMPONENT LIFE INDICATOR

TECHNICAL FIELD

This disclosure relates generally to a component life indicator. More specifically, this disclosure relates to a component life indicator for monitoring the effects of operating conditions on the work life of a machine component.

BACKGROUND

A typical work machine, such as, for example, a tractor, dozer, loader, earth mover or other such piece of equipment, has a designed work life. The designed work life of the work machine is determined, in part, by the designed work life of each individual component making up the work machine. However, the actual work life of a given component, and thus the actual life of the work machine itself, may vary from machine to machine based on use stresses to which the work machine is subjected. Use stresses that affect the work life of a work machine may include, for example, operating conditions, road layout, weather conditions, road conditions, loading practices, and efficiencies.

The designed work life of a component corresponds to the actual work life only when the actual work site resembles a “typical” or “reasonable” work site, upon which the designed work life is based. However, most work sites differ from a typical site in one or more of the use stresses that affect the component life. Accordingly, the actual work life of a component seldom matches the designed component life.

If a work machine is subjected to use stresses that are more harsh than the factors at a typical work site, then the actual work life of the machine component will be shorter than the designed work life. Failure to recognize that the component has a shorter actual work life can result in failure of the component before scheduled maintenance is performed. Operating the component until it fails often causes secondary failures of other components that are dependent upon the failed component. Further, such failures are often unpredictable in time, and may require performing maintenance in places at the work site where the work machine is not easily accessible, or the work machine may be in the path of other work machines. Thus, failure of a single component may cause increased down time and higher operating expenses for the overall operation.

On the other hand, if a work machine is subjected to use stresses that are less severe than the factors at the typical work site, the actual work life of the machine component may be extended beyond the designed work life. Accordingly, the work machine components may not need to be serviced or maintained as frequently as is normally scheduled. Accordingly, performing the scheduled maintenance may be wasteful because the components do not yet need to be serviced.

One attempt to incorporate operating conditions of a machine into maintenance decisions is disclosed in U.S. Pat. No. 5,642,284 to Parupalli et al. The ’284 patent discloses a system for determining when scheduled maintenance, such as an oil change, is due depending on the total number of miles driven, the total amount of fuel consumed, and the amount of oil in the oil sump. However, the ’284 patent does not disclose a system for monitoring the actual work life of a machine component.

This disclosure is directed toward overcoming one or more of the problems or disadvantages associated with the prior art.

SUMMARY OF THE INVENTION

A life indicator for a component of a machine is disclosed. The life indicator includes at least one sensor operably associated with the machine and configured to sense a property associated with the machine. The sensor is configured to output the sensed property as a data signal. The life indicator also includes a memory element having a first data structure that determines a damage factor for the component of the machine based at least in part on the data signal received from the at least one sensor. A processor executes the first data structure to determine the damage factor.

A method of monitoring the effect of operating conditions on a component of a machine is disclosed. The method includes sensing at least one property associated with the machine, maintaining a data structure in a memory element that determines a damage factor of the component based at least in part on the at least one property, and processing the data structure to determine the damage factor based on the at least one property.

BRIEF DESCRIPTION OF THE DRAWINGS

The foregoing and other features and advantages of the component life indictor will be apparent from the following more particular description, as illustrated in the accompanying drawings.

DETAILED DESCRIPTION

Figure 1:
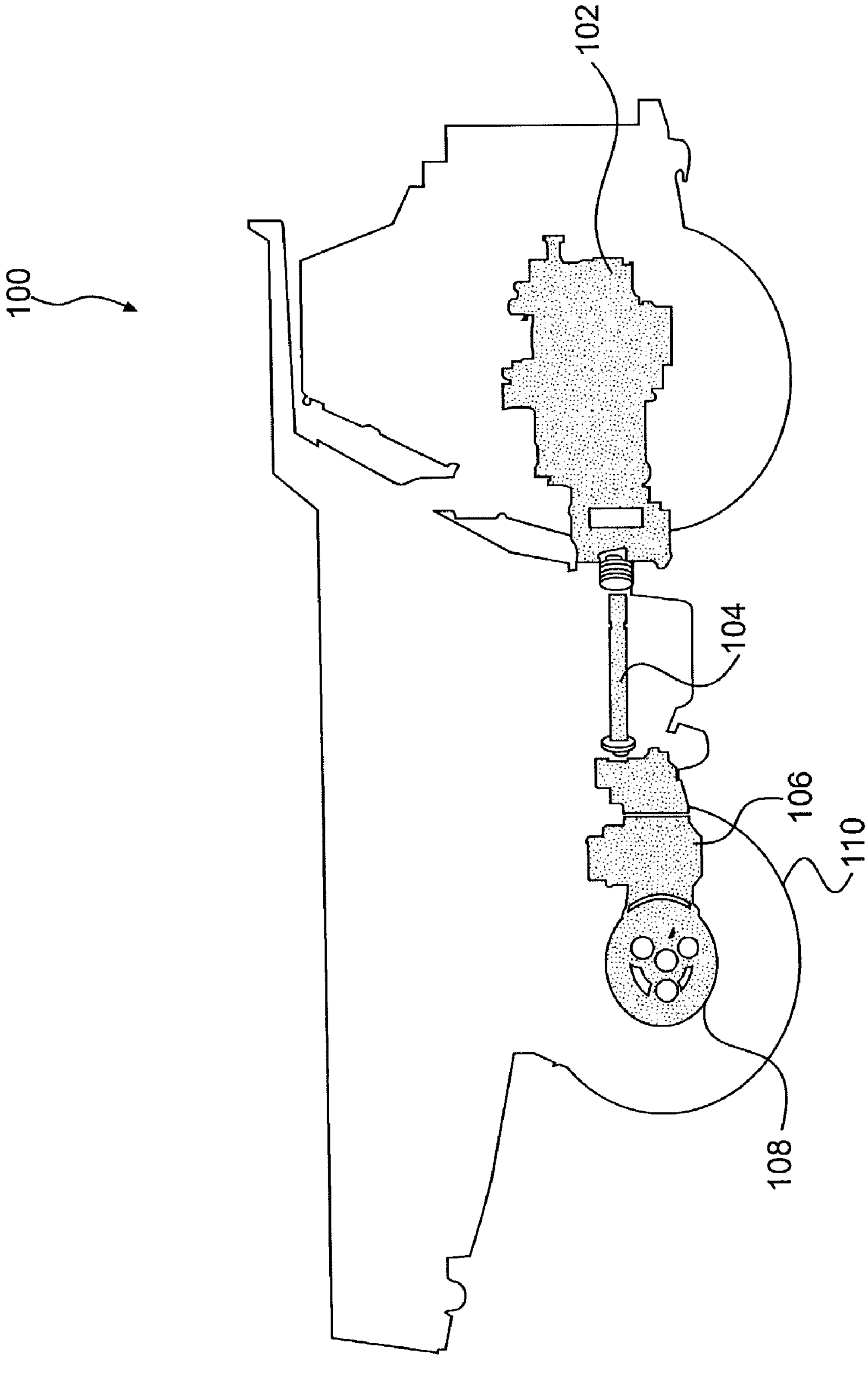
FIG. 1 is a diagrammatic side view of a work machine.

FIG. 1 is a diagram of an exemplary embodiment of a silhouette of a work machine 100 showing exemplary components that may be monitored by a component life indicator. In the exemplary embodiment shown, work machine 100 is a dump truck. However, the work machine 100 could be any work machine, such as for example, a tractor, a loader, an earth mover, an excavator, or other work machine, as would be apparent to one skilled in the art. The work machine 100 is powered by an engine 102 mechanically driving a drive shaft 104 which extends from the engine 102 to a transmission 106. The transmission 106 is mechanically connected to a final drive assembly 108. The final drive assembly 108 is mechanically connected to rear wheels 110 of the work machine 100. This driving system of the work machine 100 could be any operable configuration, as would be apparent to one skilled in the art. Moreover, while a work machine is illustrated, the present disclosure has potential applicability to other types of machines.

Because the work machine 100 is used to carry heavy loads, the torque applied to the final drive assembly 108 is very high, requiring robust components to withstand the high stresses. In order to measure the applied stresses, and predict the actual work life of a component of the final drive assembly 108, certain property factors should be known and considered. In order to obtain information on these property factors, sensors are placed on various machine components to monitor the properties of the components.

Figure 2:
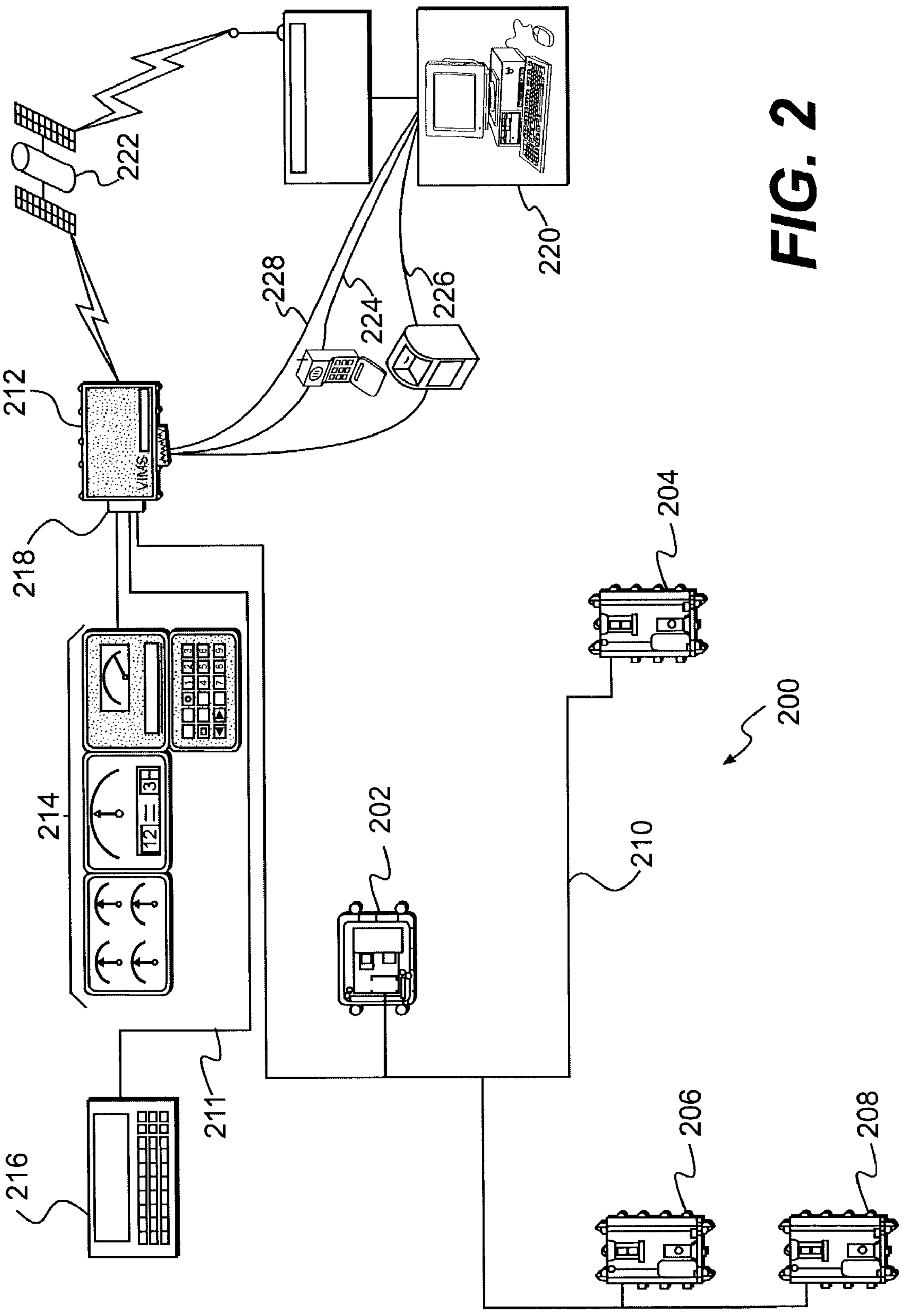
FIG. 2 is a diagrammatic representation of an exemplary electrical system.

Turning to FIG. 2, an electrical system 200 for the work machine 100 of FIG. 1 is shown. Electrical system 200 includes electronic control modules (ECM) which are associated with various sensors (not shown in FIG. 2) for monitoring and recording a number of property factors that may be considered when determining the component life. For example, the electrical system 200 may include an engine ECM 202. The engine ECM may receive signals from engine sensors, such as, for example, an atmospheric pressure sensor, a fuel flow sensor, a boost pressure sensor, a water temperature sensor, and an engine speed sensor. Additional sensors may be included to measure other properties of the engine as necessary, as would be apparent to one skilled in the art. These sensors may either provide a direct measurement of a key parameter directly relating to damage, or may provide a measurement that may serve as a factor when determining instantaneous damage. Accordingly, evaluation of the information obtained by the sensors aids operators and service personnel in determining when to perform maintenance of how best to operate the work machine.

The electrical system 200 may also include a transmission ECM 204. The transmission ECM 204 may be associated with sensors for monitoring the transmission, that may include, for example, a gear code sensor, a transmission output speed sensor, and a differential oil temperature sensor. Other sensors may be associated with the transmission ECM 204 as would be apparent to one skilled in the art. The electrical system 200 also may include a chassis ECM 206 and a brake/cooling ECM 208. Like the engine ECM 202 and the transmission ECM 204, the chassis ECM 206 and brake/cooling ECM 208 may be associated with various sensors for reading variable properties of the components within the chassis and the brake/cooling systems. Other sensors and ECMs may be included for measuring properties of other components as would be apparent to one skilled in the art. Each ECM may be associated with one or more sensors, and the specific types of sensors and the number of sensors associated with any ECM may be determined by the application and information to be obtained by the sensors.

The electrical system 200 may connect the ECMs to the sensors, to one another, and to an interface 212 with a data link 210. The data link 210 may allow communication from the various ECMs to the interface 212 and to each other, if desired. Accordingly, the ECMs may receive signals from the sensors, and also send signals to the interface 212 through the data link 210. The interface 212 may contain computer components such as, for example, a processor and a memory element that may contain any number of data structures or algorithms for performing calculations and for recording the sensed information as is explained further below with reference to FIG. 3.

A display system 214 electronically communicates with the interface 212. The display system 214 may include dials, gauges, a screen for showing numeric values, or any other display capable of communicating the actual remaining component life of a machine component. In one exemplary embodiment, the display system 214 is a graphical display of visible lights that are activated to indicate the instantaneous magnitude of stresses applied to components and measured by the sensors associated with the ECMs in real-time. In another exemplary embodiment, the display system 214 includes an audible indicator that signals when the instantaneous applied stress exceeds a designated amount. In one embodiment, the display system 214 may display relevant information when the instantaneous applied stress exceeds a designated amount. For example, the display system 214 may show the stress level, the duration of time that the stress exceeds the designated amount, the time when the designated amount is exceeded, and the location of the work machine 100 when the time is exceeded. This information may also be stored in the interface 212, for future reference.

The display system 214 could be located within a cab of the work machine 100 for viewing by the work machine operator. Alternatively, display system 214 could be located elsewhere, including a location remote from the work machine 100. In one exemplary embodiment, there is no display system 214 in communication with the interface 212. Nevertheless, the information received by the interface 212 could be stored for access and viewing by a separate system.

A service tool 216 may be used to electronically communicate with the interface 212 through a service link 211. The service tool 216 allows a service technician to access the interface to retrieve, view, download or analyze information stored in the interface 212. Further, the service tool 216 may be used to update stored information in the interface 212 to reflect, for example, maintenance performed or parts replaced, thereby keeping the component life indicator accurate. The service tool 216 may include a processor, memory, an input and output device, and may be capable of analyzing the information sent from the ECMs and information generated by the interface 212. Alternatively, the service tool 216 may be a display for showing information to the service technician.

The service tool 216 may detachably connect to the interface 212 through an interface port 218. Further, the service tool 216 may be used to determine the effects of stress upon the machine components as measured by the sensors. In one exemplary embodiment, the service tool 216 contains data structures that retrieve measured property data from the ECMs, including, for example, engine speed, fuel flow, boost pressure, water temperature, atmospheric pressure, the gear code, differential gear oil temperature, and the transmission output speed. The data structure may then calculate and determine the estimated actual work life of the final drive assembly 108.

The service tool may be selectively connected to the interface 212 at servicing intervals to obtain information stored in interface 212, or could be permanently connected to the interface 212, as would be apparent to one skilled in the relevant art. In one exemplary embodiment, the service link 211 of the service tool 216 electronically communicates directly with data link 210 to collect information on property measurements obtained by the sensors. In another exemplary embodiment, the service tool 216 contains no processor, but may be a memory element, such as a floppy disk, for receiving information from the interface 212, to be processed by a processor remote from the work machine 100.

In one exemplary embodiment, the interface 212 may transfer data to a central computer system 220 for further analysis. Although all aspects of the component life indicator could be located on-board the work machine 100, thereby eliminating the need for a communication system, the central computer system 220 allows analysis to be conducted remote from the work machine, and may allow a fleet of work machines to be monitored at a central location.

In one exemplary embodiment, data may be transferred by a satellite transmission system 222 from the interface 212 to the central computer system 220. Alternatively, the data may be transferred by a wire or a wireless telephone system 224 including a modem, or by storing data on a computer disk which is then mailed to the central computer site using the mailing system 226 for analysis. As a further alternative, each work machine may be driven to a location near the central computer system 220, and directly linked to the central computer system 220 using a central computer link 228. Other data transfer methods may be used as would be apparent to one skilled in the art, including transmitting data through a transmitter associated with the interface 212 to a receiver located remote from the work machine 100.

Figure 3:
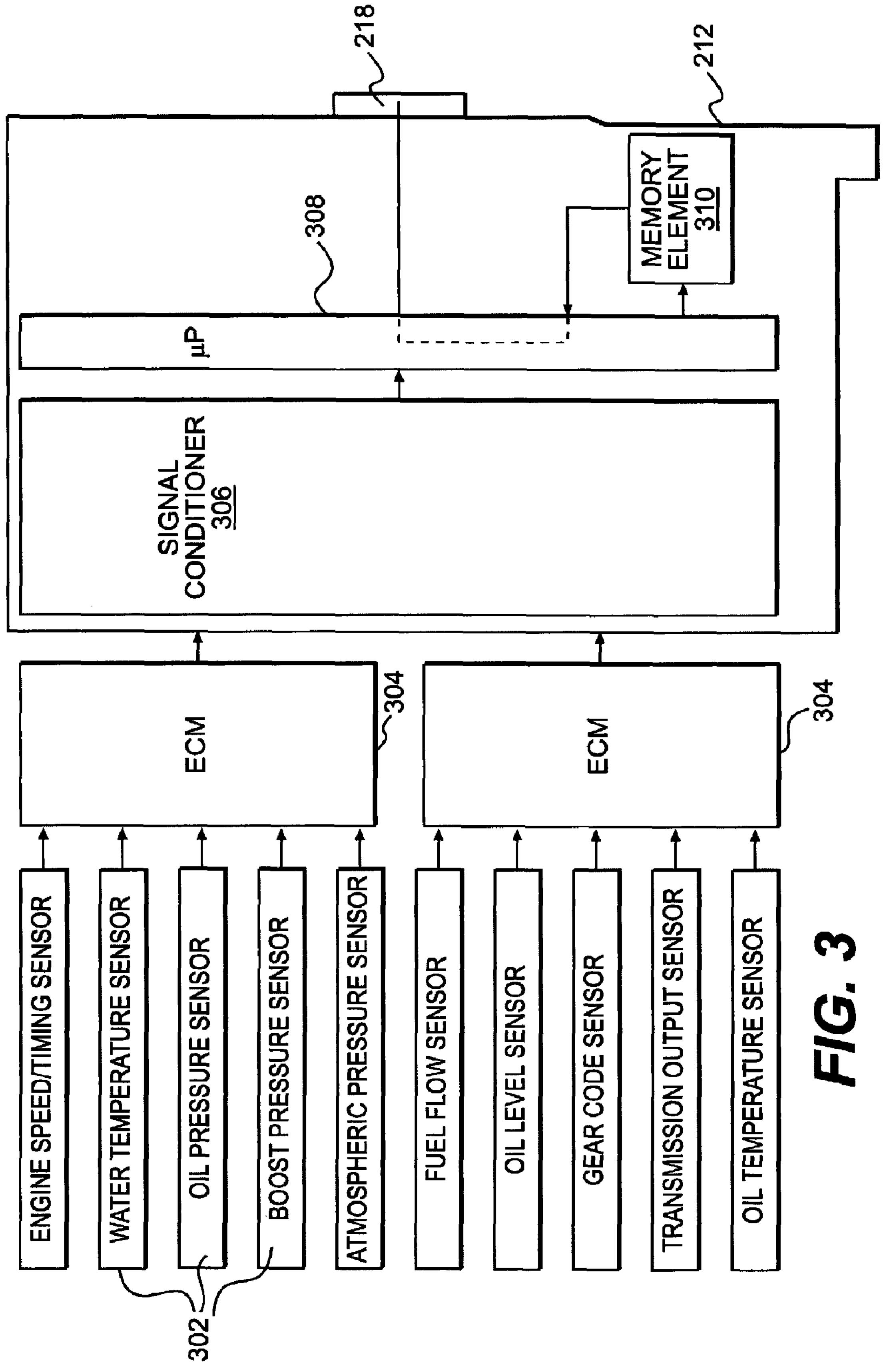
FIG. 3 is a block diagram of an exemplary electronic interface of the electrical system of FIG. 2.

FIG. 3 is an exemplary embodiment of the interface 212 showing components of the electrical system 200. As seen in FIG. 3, a number of property sensors 302 may be associated with, and send signals to, any number of ECMs 304. The ECMs 304 electrically communicate with the interface 212. A signal conditioner 306 in the interface 212 may receive electrical data signals sent by the ECMs 304 and scales, buffers, or otherwise filters the data signals to a processable signal, as is known in the art. In one exemplary embodiment, the signal conditioner 306 is housed within each ECM or sensor body, and therefore, is not contained within the interface 212.

The signal conditioner 306 communicates with a processor 308, which is in communication with a memory element 310. The memory element 310 may record the sensed property values and information collected from the ECMs 304 and may also include data structures and algorithms that represent component models such as, for example, an engine model, a lower drive model, and a final drive life model described further below with reference to FIG. 4.

Further, when the life of the component is estimated by calculating the instantaneous damage summed over the component life, the memory element 310 may be used to store the accumulating sum of damage. Similarly, when parts are repaired or replaced, the information in the memory element 310 may be reset to reflect the new or repaired state of the component. Additionally, when an instantaneous stress exceeds a designated value, the memory element 310 may be used to store or log additional parameters that may be useful to a service person to repair or maintain the work machine components. This information may include, for example, the time, duration, level of stress or damage, and location of the work machine when the damage occurred.

The processor 308 may be configured to retrieve stored data structures or information from the memory element 310, input the conditioned property values sent by the ECMs 304 into the data structures, and compute various output values such as the actual work life of a component, etc. The interface 212 may receive data signals from the ECMs 304 in real-time, and instantaneously convert the data signals into values that may be recorded on the memory element 310 or outputted to the display system 214 of FIG. 2 through the interface port 218.

It is contemplated that the property sensors 302 may be in direct electrical communication with the interface 212, bypassing the ECMs 304. Further, the ECMs 304 may filter, alter, change, or combine electrical signals from the sensors 302 prior to communicating the signals to the interface 212. Additionally, as used in the present description and claims, the description and recitation of a sensor may include both the property sensors 302 and the ECMs 304, which may include calculated parameters, as both relay electrical signals representative of the sensed properties to the interface 212.

Figure 4:
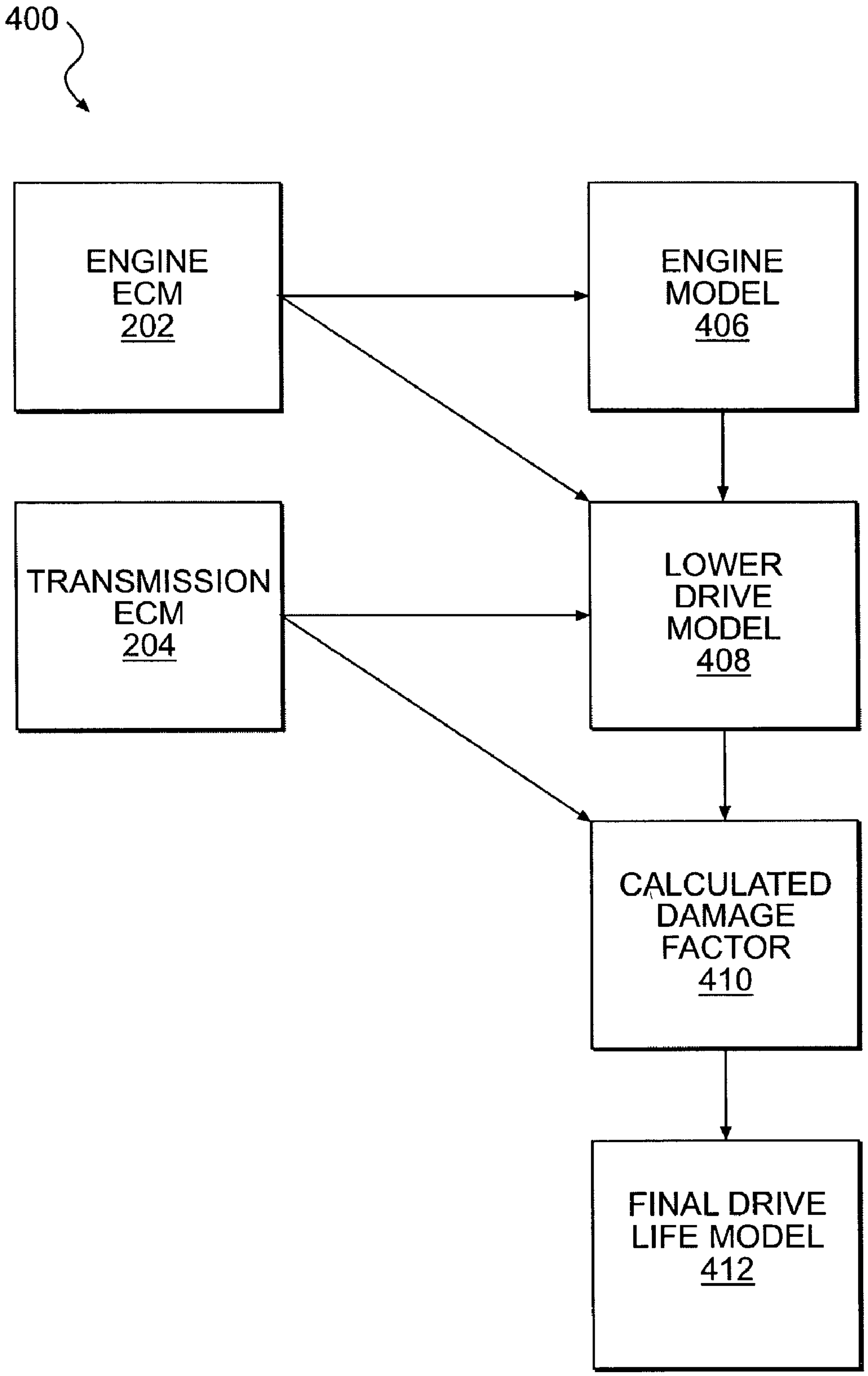
FIG. 4 is a block diagram showing an exemplary relationship between sensed properties and saved component data structures.

FIG. 4 is an exemplary block diagram 400 showing the relationship between the sensed properties from the ECMs and component models in the data structures of interface 212 and/or service tool 216. The component models may be algorithms contained within the data structures based on engineering formulas, experimental data, and rules of thumb, as would be apparent to one skilled in the art. These principles are used to determine the designed life of components for any application. The models vary for each component, and are individually designed to output desired information. The component models rely upon the data signals received from the property sensors for real-time, accurate property values. Additionally, the component models may rely on calculated values from other component models or data structures for data that may not be directly measurable by a sensor.

In the exemplary block diagram 400, the sensed properties and component models may be used to determine a calculated damage factor, indicative of the instantaneous stress applied to the components of the final drive assembly 108 during use of the work machine 100.

The calculated damage factor of the final drive assembly is dependent on a number of factors, including the differential gear oil temperature, the transmission output speed, and the transmission output torque. Although the oil temperature and the transmission output speed may be directly measured by property sensors, the transmission output torque cannot be directly measured, and must be calculated. The transmission output torque is dependent on the calculated engine output torque, as set forth below. The block diagram 400 sets forth the relationships and data structures for determining first, the transmission output torque, and then, the calculated damage factor of the final drive assembly.

The exemplary block diagram 400 shows the engine ECM 202, which may be associated with one or more of the following property sensors: an atmospheric pressure sensor, a fuel flow sensor, a boost pressure sensor, a jacket water temperature sensor, and an engine speed sensor. These property sensors collect information from the engine 102 and communicate the collected information as data signals to the engine ECM 202, which electrically communicates with the processor 308 of FIG. 3.

An engine model 406, contained as a data structure within the memory element 310 is retrieved by the processor 308. In this embodiment, the engine model is configured to calculate the engine output torque as a calculated property value. The data structure containing the engine model 406 determines the engine output torque as a calculated property value, and sends the engine output torque to a lower drive model 408.

The memory element 310 may include a data structure containing the lower drive model 408. The lower drive model 408 is configured to determine the output torque of the transmission system. The lower drive model 408 may determine the transmission output torque based on data inputs, including the engine output torque as received from the engine model 406, data signals that represent the engine speed from the engine ECM 202, and the gear code and transmission output speed from a gear code monitor and a transmission output speed sensor associated with the transmission ECM 204.

In one exemplary embodiment, the engine speed is modified to be the rate of change in engine speed, and the transmission output speed is modified to be the torque converter output speed. In this embodiment, the torque converter output speed, the engine output torque, the rate of change in engine speed, and the gear code are used to determine the calculated transmission output torque. The lower drive model 408 outputs the transmission output torque as a calculated property value that may used in a data structure that determines an instantaneous calculated damage factor 410. Additionally, the calculated damage factor 410 may be based upon the differential gear oil temperature and transmission output speed received from the transmission ECM 204. The damage factor is indicative of the instantaneous stress applied to the components during use of the work machine.

The calculated damage factor may be used by a data structure representing a final drive life model 412 contained within the memory element 310 to determine the actual component life. The final drive life model 412 may consider the instantaneous calculated damage factor 410 and add the instantaneous damage factor to an accumulated damage or history of damage, thereby accumulating and maintaining information representative of the total damage over time. The total damage may then be used to estimate the work life of the component. The damage factor and/or the actual work life may be displayed to an operator or saved in the memory element for future reference by a service technician.

The models vary for each component, and are individually designed to output desired information. For example, in the embodiment described, the engine model merely outputs the calculated engine torque. However, as would be apparent to one skilled in the art, the same sensed properties may be used in a life model for any component, including an engine life model, to calculate a damage factor for the component.

Figure 5A:
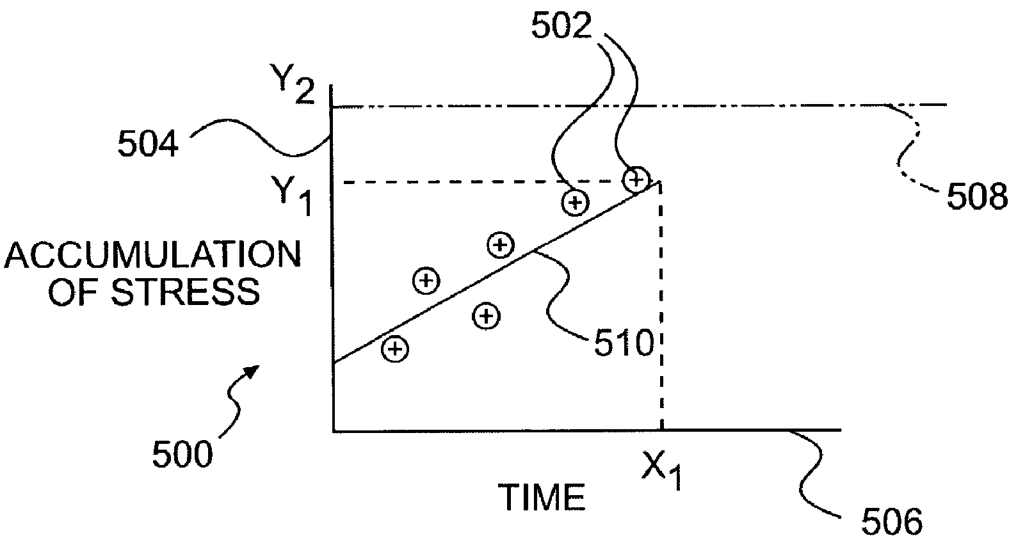
FIGS. 5A and 5B are exemplary graphs showing a projection of a damage factor line to determine the actual work life of a component.
Figure 5B:
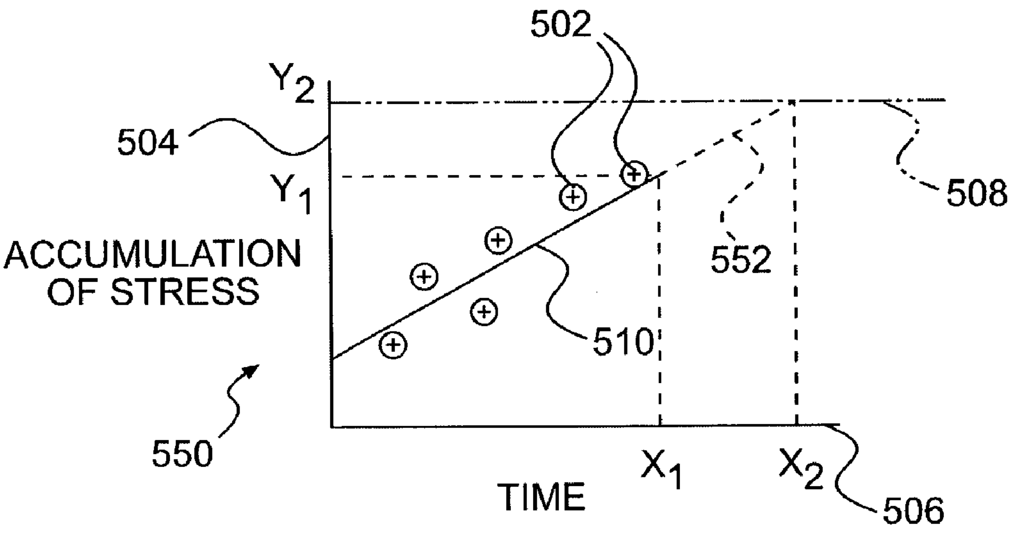

FIGS. 5A and 5B describe an exemplary method for determining the actual work life of a machine component based upon a calculated damage factor. FIG. 5A is a plot 500 showing the accumulation of stress, or, the accumulation of the damage factor over time. The plot 500 includes a vertical stress axis 504 and a horizontal time axis 506. The time axis 506 is the actual machine operating time.

Individual damage factor points 502, recorded at time intervals over the life of the component, indicate the accumulation of the instantaneous applied stress over that period of time. The damage factor points 502 may be plotted on plot 500 and/or recorded in the memory element of the interface. In one exemplary embodiment, the damage factor is recorded at time intervals of 0.1 seconds.

The plot 500 also includes a designed component life data line 508 set at a specific stress accumulation value for the component, which is based upon designed component life data. The designed component life data includes the designed life of the machine component and is determined during design of the component using standard engineering design methods as is known in the art. When the accumulation of stresses applied to the component, as indicated by the damage factor points 502, reach or exceed the designed component life data line 508, the machine component should be serviced or replaced.

A curve, such as line segment 510, is fitted to the damage factor points 502 as shown in plot 500. The slope of the line segment 510 may be calculated using conventional systems as is known in the art, and may not be a straight line. In one exemplary embodiment, the root means square method is used to fit the line segment 510 to the damage factor points 502.

FIG. 5B shows a plot 550 which estimates the actual component life of the machine component being monitored. The plot 550 is similar to plot 500 of FIG. 5A, but includes a projected life line 552. The projected life line 552 is an extension of the line segment 510, projected at the same slope as the line segment 510. The time of the intersection of the projected life line 552 and the designed component life data line 508 indicates the estimated actual work life, in time, of the monitored component. Furthermore, from the plot 550, other information may be easily estimated, including, for example, the remaining work life in hours, the percentage of life used, and the percentage of life remaining.

In one exemplary embodiment, the accumulation of stress may be expressed as damage units, with the component having a designed life of a designated number of damage units. In this exemplary embodiment, the plot 550 enables the system to determine information regarding the life of the component including, for example, the remaining work life in damage units, the percentage of damage units used, and the percentage of damage units remaining.

In one exemplary embodiment, the slope of the line segment 510 is determined in a seasonal cycle, being calculated for each season of the year. Accordingly, the line segment 510 may not be a straight line, but may be an incremental line or curve, having a different slope at different increments. Likewise, the projected life line 552 need not be a straight line, but may be curved to best estimate the component life. In this embodiment, the projected life line may mimic the incremented line segment.

Figure 6:
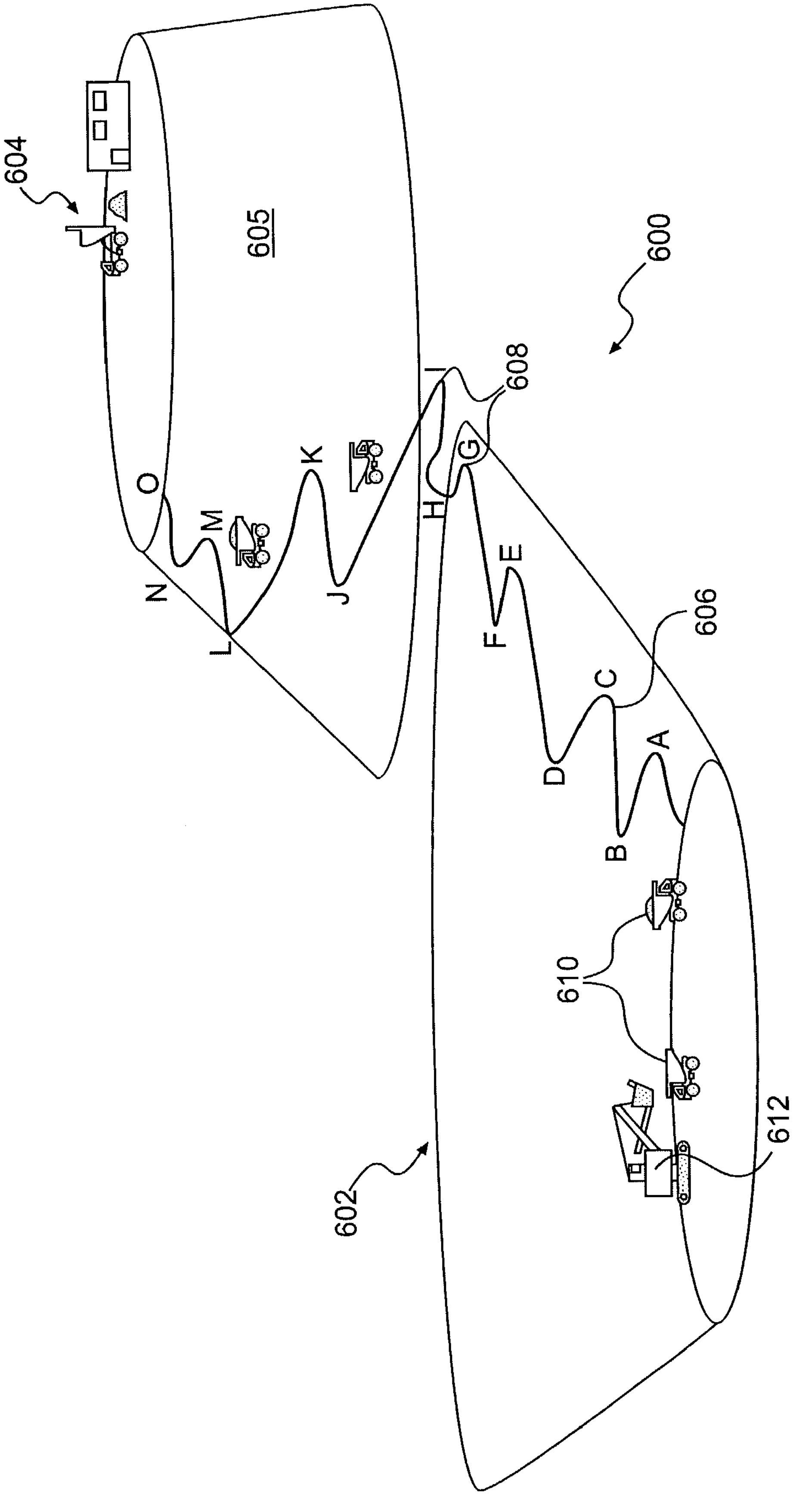
FIG. 6 is a sketch diagram of an exemplary open pit mine showing a hauling cycle for a work machine.

FIG. 6 shows an exemplary mining site 600 including an open pit mine 602 and a processing region 604 on top of a dumping mound 605. The open pit mine 602 is connected to the processing region 604 by a road 606 which includes switch-backs 608. Work machines 610 travel from the bottom of the open pit mine 602 along the road 606 to the processing region 604. In the bottom of the open pit mine 602, a digging machine 612 operates to dig and dump dirt and other materials into the work machines 610. Accordingly, the work machines 610 are loaded with dirt when traveling from the open pit mine 602 to the processing region 604. At each switch-back 608, a letter marker is shown. The letter markers correspond to similar letter markers in FIG. 7, as explained below.

Figure 7:
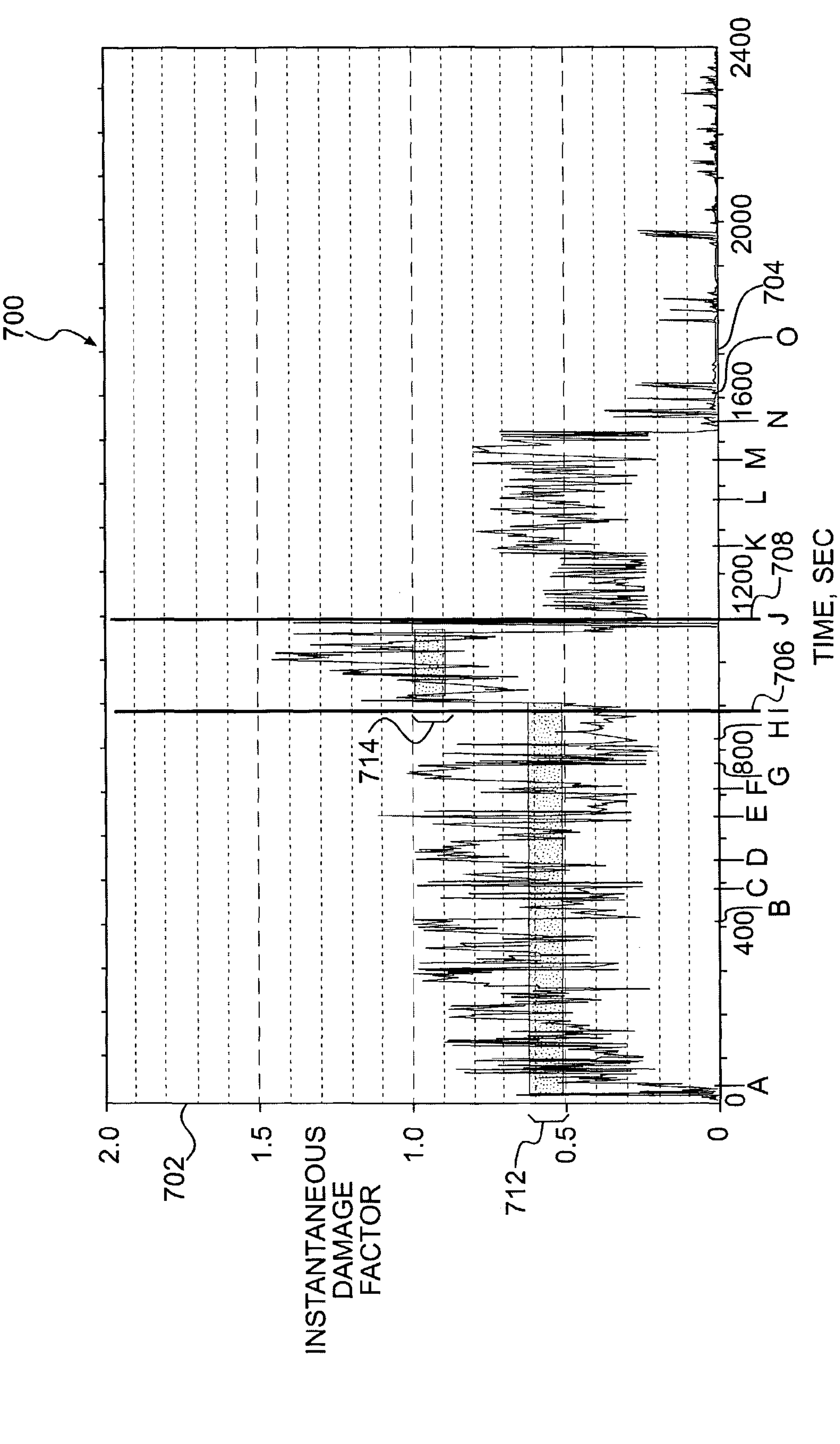
FIG. 7 is an exemplary graph showing a measured damage factor of a final drive bearing of a work machine performing the hauling cycle of FIG. 6.

FIG. 7 is a plot showing the damage factor on the final drive assembly of a work machine traveling along the road 606 of FIG. 6. The damage factor is indicative of the stresses applied to various components of the work machine. The plot 700 has an instantaneous damage factor axis 702 and a time axis 704, showing time in seconds. The plotted damage factor shows the load applied to the final drive assembly during a hauling cycle from the bottom of the open pit mine 602 to the processing region 604. Along the time axis 704, letter markers are shown. These letter markers correspond to the letter markers shown along the road 606 in FIG. 6.

A first average damage factor 712 shows a fairly consistent damage factor reading for about the first 800 seconds of the work cycle. Beginning at about 800 seconds into the work cycle, as shown at line 706, the second average damage factor 714 is much higher. At about 1050 seconds into the work cycle, as shown at line 708, the damage factor decreases considerably. Analysis of plot 700 indicates that the damage factor during the 250 second period between line 706 and line 708 is much higher than at other periods of the work cycle.

The time period between lines 706 and 708 corresponds to letter markers I and J on road 606 of FIG. 6. By comparing plot 700 to the mining pit of FIG. 6, one can determine the areas or regions that are applying high stress to the final drive assembly of the work machine. In one embodiment, a global positioning satellite receiver (GPS) may be used to determine the actual location of the work machine 100 during high stress conditions. The GPS may be associated with the interface 212 and may be activated when preset conditions are met, such as, for example, when the instantaneous calculated damage factor exceeds a designated amount. In this case, the region of road 606 of FIG. 6 between letter markers I and J was rough and bumpy. Accordingly, the stresses applied to the final drive assembly of the work machine were higher in that region than in other regions along the road 606 of FIG. 6.

By plotting the accumulation of stresses to determine the actual work life of the component, as explained with reference to FIGS. 5A and 5B, a service technician can determine that the region of road between the letter markers I and J decreases the actual component life of the final drive assembly by a measurable amount. By conducting this analysis, the service technician can determine the factors that contribute to stresses that are applied to components of the work machine. Once these factors are recognized, steps can be taken to reduce the impact of these factors on the component life.

For example, if a mine operator were to choose to repair any portion of the road 606 of FIG. 6, it would be in his or her interest to repair the section of road between the letter markers I and J, which are stressing components of the final drive of the work machine. By removing the impact of the high stress section of the road 606 between letter markers I and J, the components of the work machine will have a longer work life. Other corrective measures could also be taken including, for example, rerouting the work machine and/or instructing operators to drive more slowly through designated areas.

A rough road is one environmental factor that affects work life of machine components. Other factors may include, for example, weather, humidity, whether the work machines are used continuously, whether the work machines are traveling uphill, downhill, or along level ground, and the conditions of the road, including whether the road is a sand, gravel, or paved road. The component life indicator can be used to estimate and predict the impact of these use stresses on the work life of various components of the work machine. Accordingly, machine operators can take action to reduce the impact of these use stresses and prolong component life, or machine servicing may be adjusted to compensate for these use stress changes.

Figure 8A:
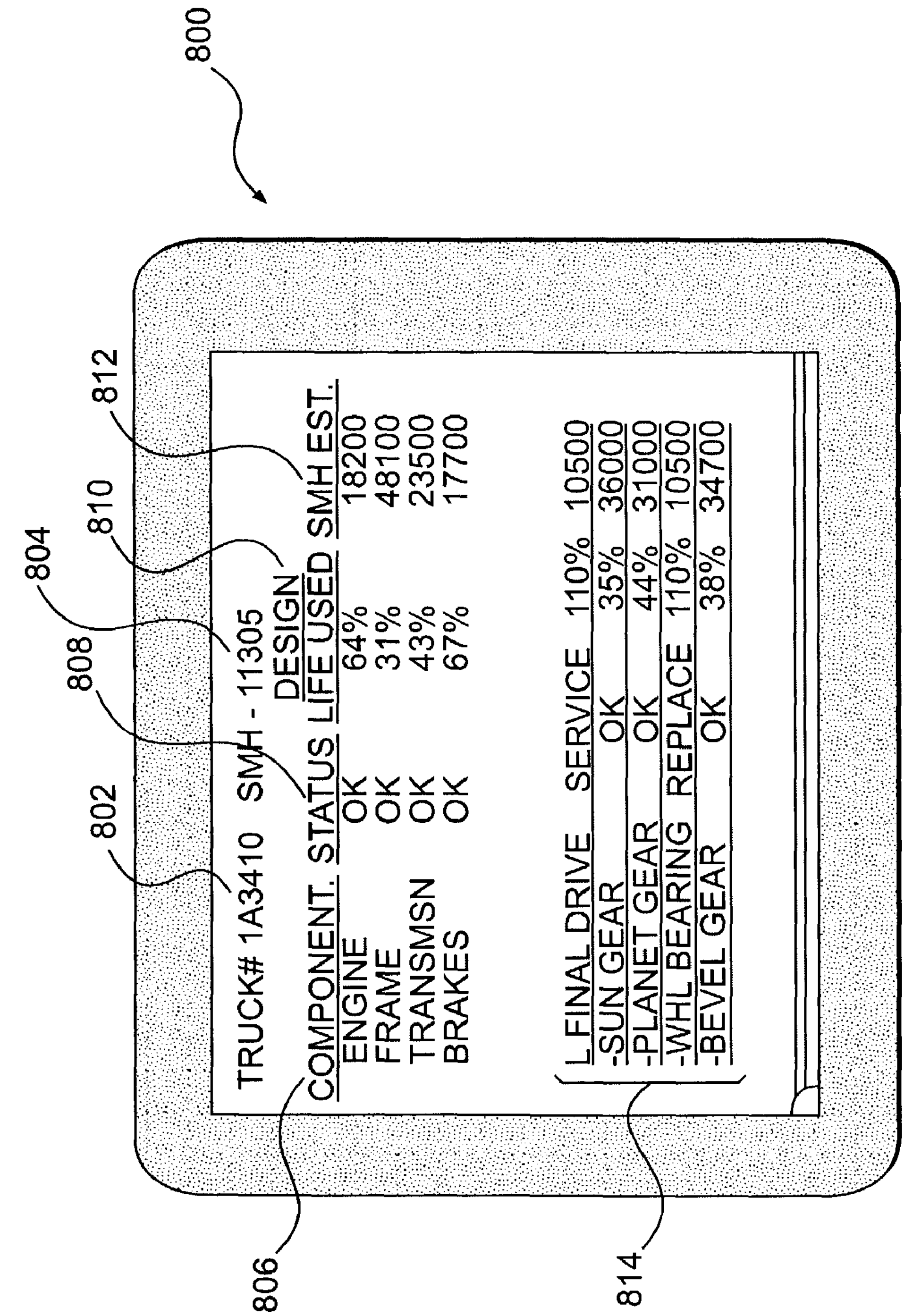
FIGS. 8A-8C are diagrams of exemplary interface displays.

FIG. 8A is an exemplary display 800 showing the component life of various components on an exemplary work machine. The display could be the display system 214 described with reference to FIG. 2, and could be on-board the work machine. The display 800 may include a truck identification number 802 and a service meter indicator 804 showing the service meter hours (SMH) representing the total machine hours. The display may include a component list 806, a status list 808 showing the status of each component, a percentage of design life used list 810 showing the percentage of design life used for each component, and a service meter hours list 812 showing the projected life in hours for each component. In the exemplary embodiment of FIG. 8A, the engine component has an OK status with 64% of the life used. The estimated service meter hours for 100% used engine life shows the engine hours at 18,200 hours. In this exemplary embodiment, the service meter hours are the estimated service life of the component based upon the past use of the component as measured by the component life indicator.

A subcomponent list 814 is shown on the bottom half of display 800. The subcomponent list 814 includes a major component, and the subcomponents that are included in the major component. In the exemplary subcomponent list shown, the left final drive assembly is the major component, while the gear and bearing components are subcomponents of the left final drive assembly. The left final drive assembly is at 110% of its work life. Accordingly, the status for the left final drive assembly is shown as requiring SERVICE. Monitoring the subcomponents enables a service person to determine which subcomponent to service. In this exemplary embodiment, the wheel bearing is at 110% of its work life. Accordingly, the status indicator list 808 for the wheel bearing indicates that the wheel bearing should be replaced. The service meter hours list 812 on the wheel bearing is set at 10,500. Likewise, the service meter hours on the left final drive assembly are set to match the wheel bearing hours because the wheel bearing is the limiting component for the final drive assembly life.

In one exemplary embodiment, the status indicator list 808 is changed to show that service is required when a determined percentage of the estimated component life is used, such as, for example, 95%. Accordingly, whenever a component has reached 95% of its actual work life, the status indicator list 808 is changed from OK to SERVICE.

Display 800 could include other information, such as percent of life remaining, percent of life used, hours remaining, remaining damage units, percentage of damage units used, or percentage of damage units remaining. Furthermore, display 800 could be any display including a graphical display showing the magnitude of the damage factor or stresses applied to the component. The display could be a gauge or a dial or other display as is known in the art.

Figure 8C:
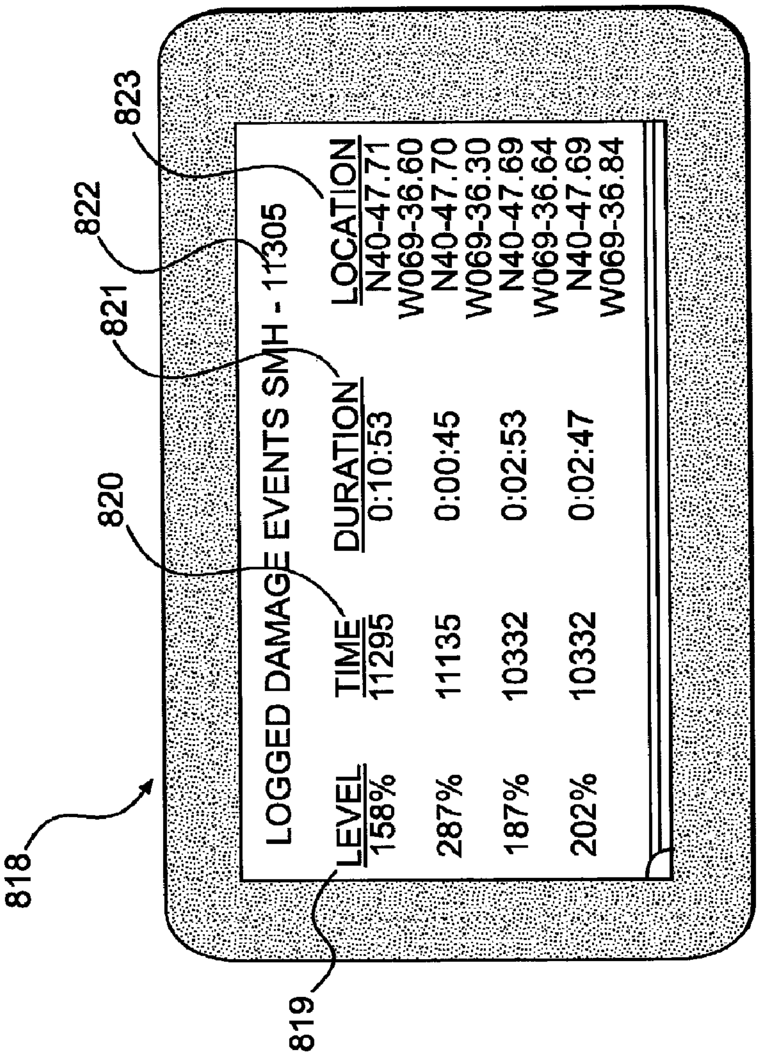
Figure 8B:
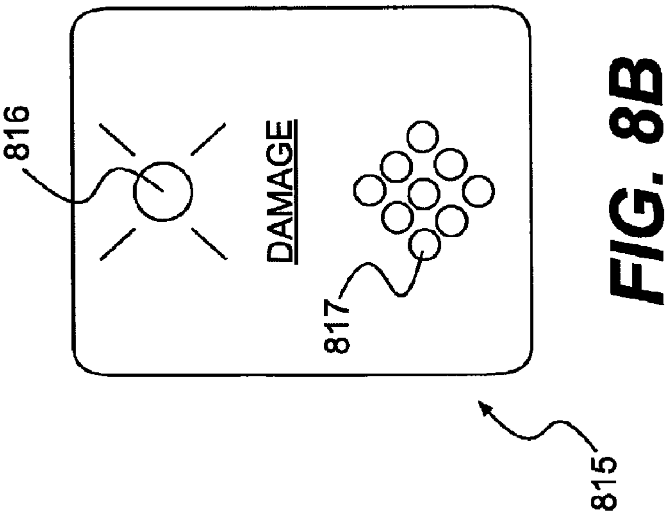

FIG. 8B shows another exemplary embodiment of a warning display 815. The display could be part of the display system 214 described with reference FIG. 2, or associated with the display 800 described with reference to FIG. 8A, and may be within the cab of the work machine 100. The display 815 may include a lamp 816 and an audible alarm 817. The lamp 816 may be adapted to signal to the operator that the instantaneous damage factor has exceeded a preset threshold and a change in machine operation is recommended to reduce the instantaneous damage factor. In one embodiment, the lamp 816 is adapted to signal in different colors to indicate different levels of the damage factor. For example, the lamp may be green when the instantaneous damage factor is acceptable, and red when the instantaneous damage factor exceeds a preset level. In another embodiment, the lamp 816 includes several lamps, adapted to indicate the level of the damage factor to the operator.

The audio alarm 817 may be adapted to emit an pulse to warn an operator if the instantaneous damage factor continues to increase after the lamp 816 is turned on. The audio alarm 817 could emit any sound that may alert the operator to the excessive stress conditions.

When excessive machine damage occurs, as determined by an excessively high damage factor, information about the circumstances surrounding the high damage factor may be logged by the interface 212. The information may be helpful to a service technician or a site supervisor to identify the cause of the excessive damage and determine the treatment and activity of the work machine 100. FIG. 8C is an exemplary embodiment of a logged damage events (LDE) display 818 showing logged information. The LDE display 818 may include information such as, for example, a damage level list 819, the time of occurrence list 820 expressed in machine hours, a duration of the excessive damage list 821, and a machine location list 823. The machine location list 823 may include information obtained from a GPS included on the work machine 100. Also, the SMH hours 822, representing the total use of the work machine 100, may be shown.

For each instance that the instantaneous damage factor exceeds the preset amount, the level of the damage factor, the time of occurrence, the duration, and the machine location may be stored and displayed in lists 819, 820, 821, and 823, respectively. The excessively high damage factor could be the result of, for example, an over loaded machine, poor road conditions, environmental conditions, an abusive operator, or other such factors. The LDE display 818 may be a separate image shown on the display 800, or may be a display separate from the display 800.

Figure 9:
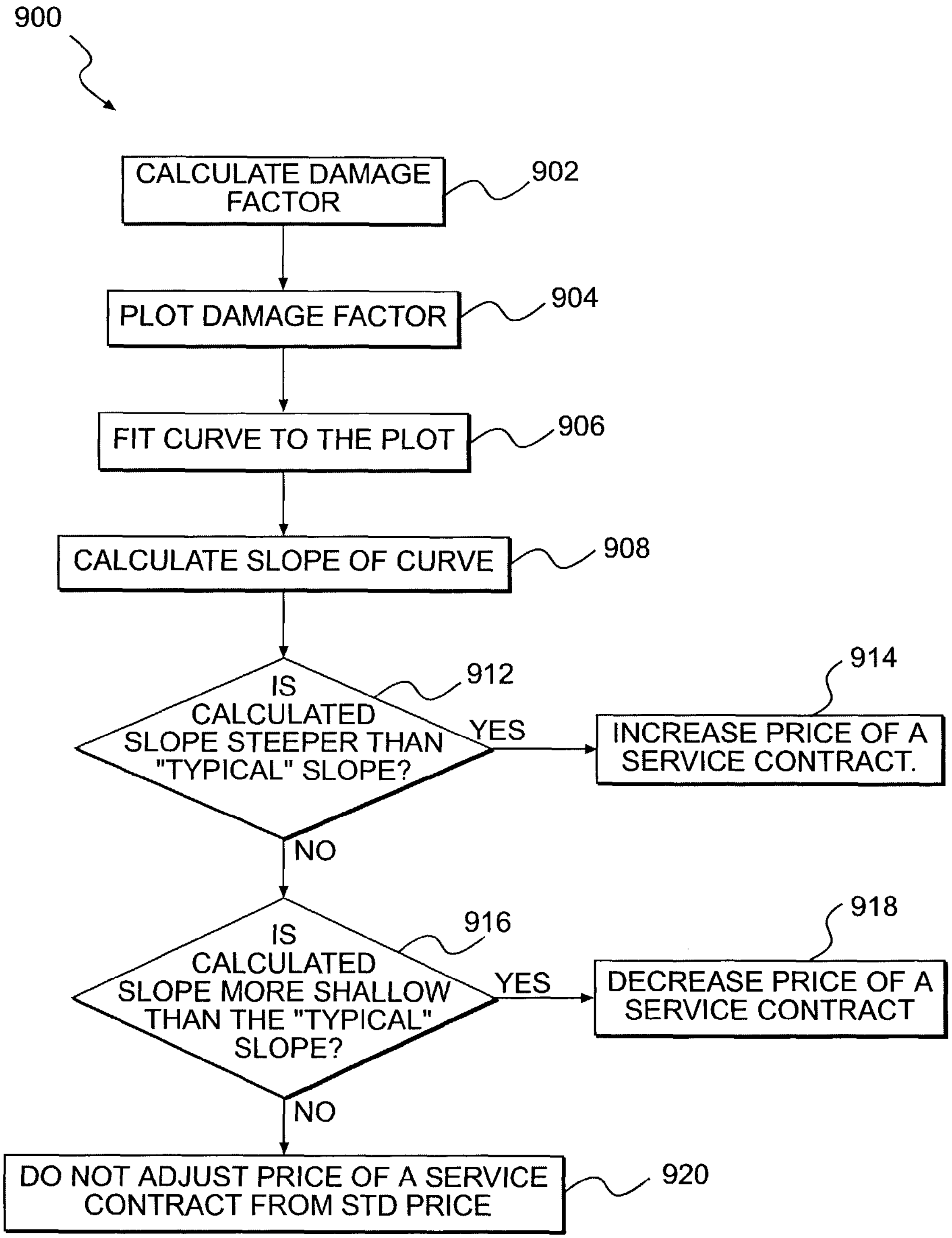
FIG. 9 is an exemplary flowchart for pricing a service contract.

FIG. 9 is a flow chart 900 showing a method for pricing a service contract. The component life indicator enables operators and service personnel to predict the failure and work life of components of a work machine based upon the actual work conditions. Accordingly, service personnel may choose to price a service contract based on the measured component work life. Such pricing provides a more accurate estimate of the actual service expenses than a single standard service contract price that fails to consider the impact of use stresses on the machine.

The damage factor for components of the work machine is calculated at step 902. The calculated damage factor may be based on use of the work machine over a period of time at the actual work site, such as, for example, two weeks. The calculated damage factor is plotted at a step 904. The damage factor could be calculated using the method described with reference to FIG. 4 and plotted using the method described with reference to FIG. 5A.

At a step 906, a curve is fitted to the plot. The curve could be similar to the curve described with reference to FIG. 5A. The slope of the curve is calculated using known methods at a step 908. Once the slope of the curve is calculated, the curve may be projected to estimate the component life as described with reference to FIG. 5B.

At a step 912, the calculated slope of the curve is compared to a typical use slope to determine whether the calculated slope is steeper than the typical use slope. The typical use slope is the slope of a damage factor plot for a theoretical use site. The typical use slope may be based upon the predicted damage for a designed component, or based upon data received over time regarding component failure in prior work machines. If the calculated slope is steeper or has a higher slope than the typical use slope, the method advances to a step 914. At step 914, the service technician increases the price of the service contract. The amount of the increase in the price of the service contract may correspond to the difference in the calculated slope from the typical use slope.

If the slope is less steep or equal to the typical slope, then the method advances to a step 916. At step 916, if the calculated slope is less steep than the typical use slope, then the price of the service contract is decreased, as is shown at a step 918. If the calculated slope is not less steep than the typical slope, then the method advances to a step 920 and no adjustment is made to the price of the service contract from a standard price based on the typical use slope.

However, the method need not compare the calculated slope to the typical use slope. For example, in one exemplary embodiment, the service price of the contract could be based upon a table prepared for such purposes. The table could indicate that a slope value within a certain range indicates that a service contract should be sold at a stated price. Alternatively, the price of a service contract could be based upon the damage factor itself. Accordingly, if the damage factor falls within a given range, or averages a given value, then the price of the service contract also falls within a given range.

The method described with reference to FIG. 9 may also be used to adjust the price of service contracts already in effect. By knowing the work life of components, service technicians are able to monitor the factors that affect work life. As the factors change, the service technician may choose to change the price of the service contract. For example, roads at a work site may erode, making the roads rougher, and causing more damage to machine components, or the mine site layout may have significantly changed over time. Therefore, the service technician may increase the price of the service contract to correspond to the increased damage.

Figure 10:
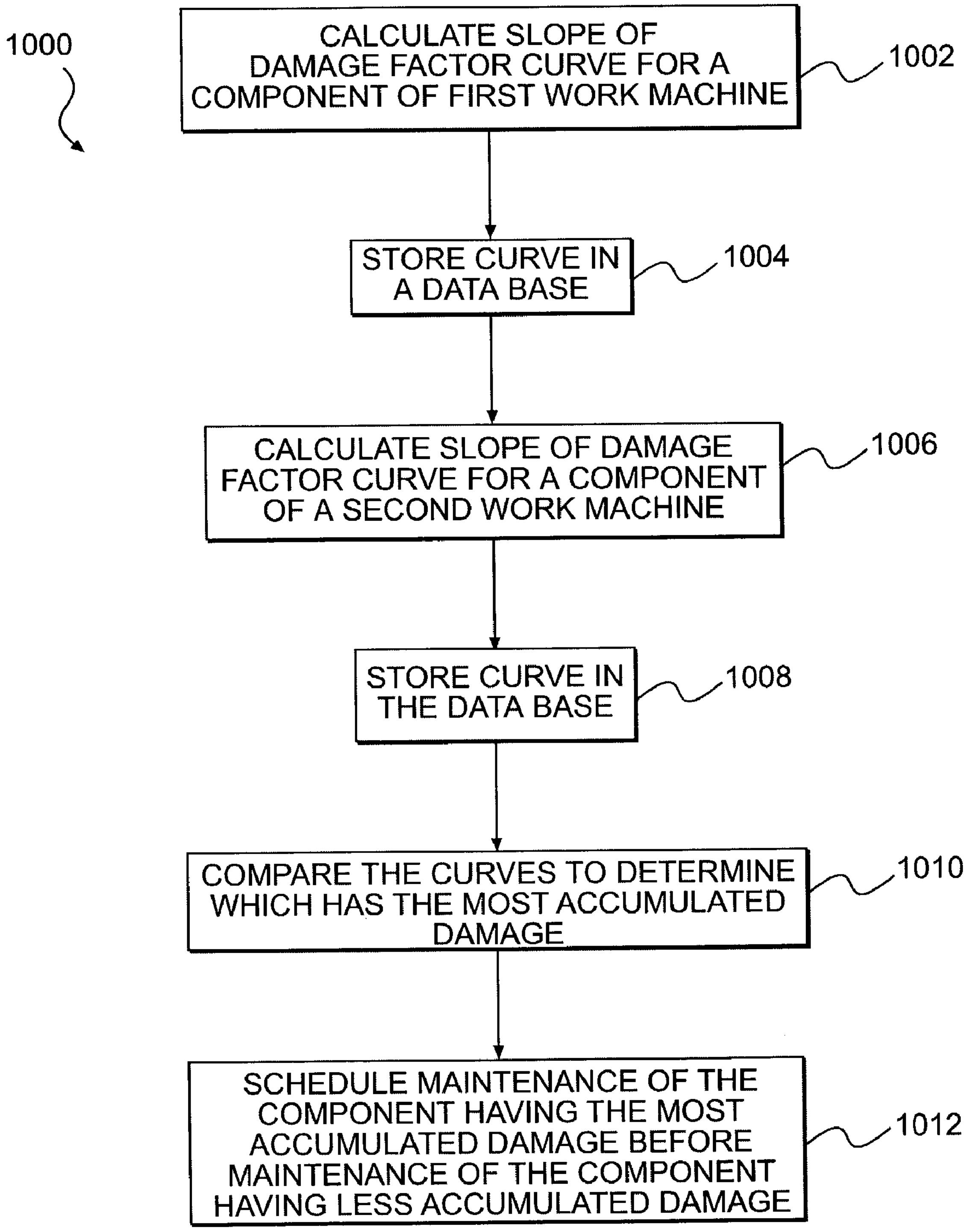
FIG. 10 is an exemplary flowchart for maintaining a fleet of vehicles.

FIG. 10 is a flow chart 1000 for servicing a fleet of vehicles using the component life indicator. In a step 1002, the component life indicator calculates the slope of the damage factor curve for a component of a first work machine as described above. Information representing the curve is stored in a database at a step 1004. The database could be an element of the central computer system 220 described above with reference to FIG. 2. At a step 1006, the slope of a damage factor curve for a component for a second work machine is calculated. At a step 1008, information representing the second damage factor curve is also stored in the database.

At a step 1010, a processor accesses the stored information and compares the first and second curved slopes to determine which slope is steepest, and projects which has the most total accumulated damage for service planning. At a step 1012, maintenance of the component of the work machine having the most accumulated damage is scheduled to occur prior to maintenance of the component having the less accumulated damage.

This method allows operators of a fleet of work machines or other vehicles to determine which vehicle is most in need of servicing. Accordingly, service of the work machines may be prioritized, with the components having the most damage being serviced before components having less damage. Comparison of the stresses applied to different work machines may enable site managers to find ways to extend the work life of the work machines by monitoring controllable factors, such as driver skill and driver abuse of the work machines, where a work machine driven by a careful or more skilled driver will have less damage than a work machine driven by an abusive or less skilled driver.

Figure 11:
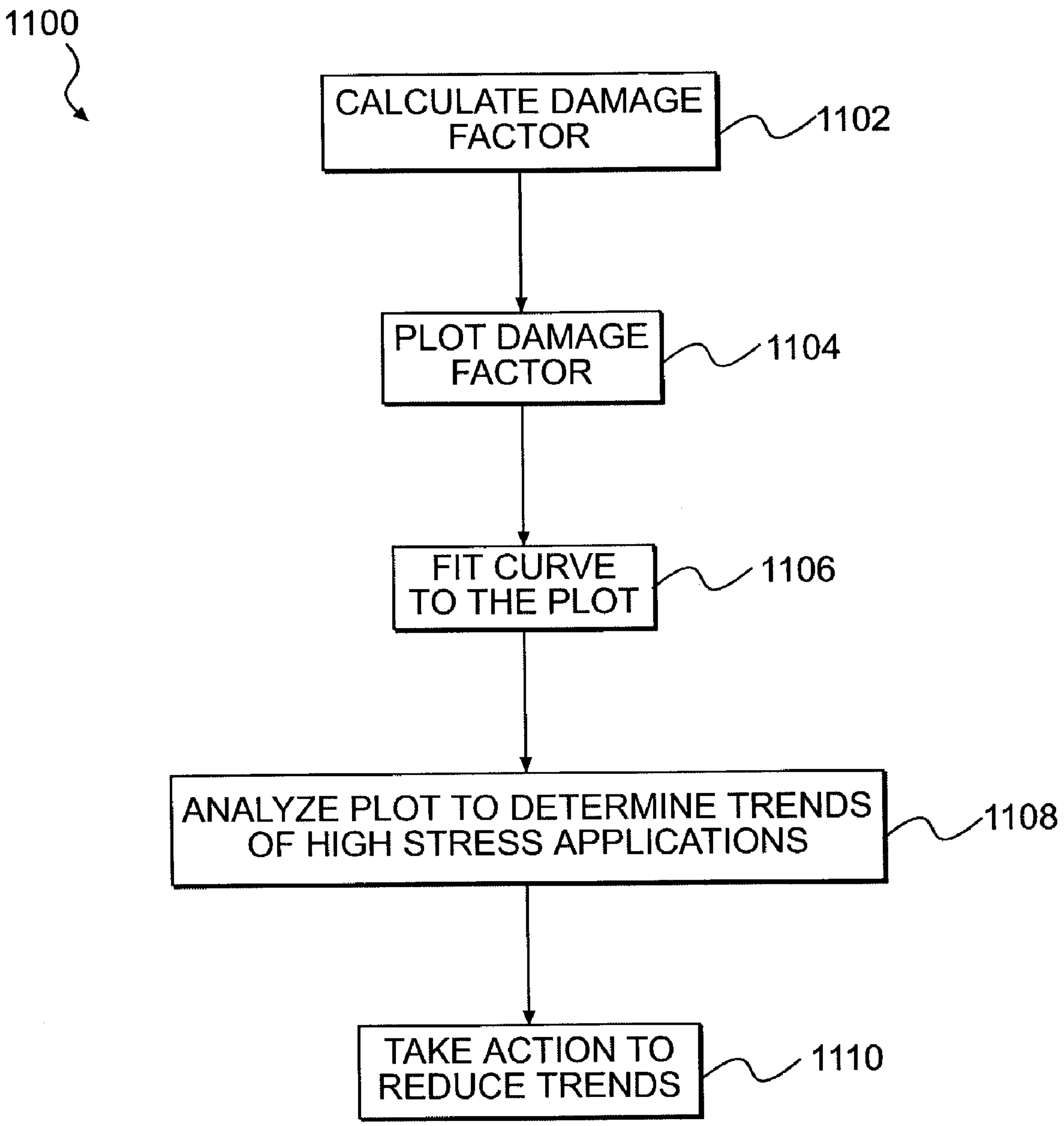
FIG. 11 is an exemplary flowchart for recognizing stress trends.

FIG. 11 shows a flow chart 1100 for recognizing stress trends. At a step 1102, the damage factor is calculated as set forth above. At a step 1104, the damage factor is plotted. At a step 1106, a curve is fit the plot as set forth above. At a step 1108, the plot is analyzed to determine the trends of high stressed applications. These high stressed applications could be, for example, the use stresses discussed above with reference to FIGS. 6 and 7. At a step 1110, action is taken to reduce the impact of the high stress applications. This action may be any action including, for example, repairing roads, changing the grade or switch back of the road layout, repairing road conditions, changing loading practices, such as spreading the loads within the bed of the work machine, reducing loading weight, setting speed limits, and changing other controllable factors.

INDUSTRIAL APPLICABILITY

Work machines such as off-highway vehicles and large mining and construction machines represent large investments. Productivity is reduced when they are being maintained or repaired. To reduce the loss of productivity, the component life indicator may be used to more accurately predict when failure will occur and when maintenance should be performed on a machine component. Accordingly, a serviceman may be able to rely on the component life indicator to make educated decisions about when to perform maintenance, and what maintenance to perform. Accurate prediction of the actual work life of components may reduce repair costs and may result in less machine downtime.

The component life indicator measures stress applied to the components of the machine and translates those stresses into an actual work life for the component of the work machine. The actual work life may be used to plan servicing of the work machine that corresponds to the actual life of component, rather than an estimated period of time. Consequently, servicing may be performed more efficiently.

The component life indicator may also be used to monitor a fleet of vehicles. Information obtained by the component life indicator on one machine may be compared to information obtained by component life indicators on other machines. Accordingly, service of the work machines within a fleet may be prioritized. Furthermore, the component life indicator may enable site managers to find ways to extend the work life of the work machines by monitoring controllable factors.

The component life indicator may be used to measure the life of any component on the work machine, including engine components, transmission components, brake components, cooling components, gear components, final drive assembly components, and other components as would be apparent to one skilled in the art. The component life indicator may also be used in automobiles, boats or other machines having components whose service life may be affected by stress applied by use stresses, making the actual work life unpredictable.

Other embodiments of the component life indicator will be apparent to those skilled in the art from consideration of the specification and practice disclosed herein. It is intended that the specification and examples be considered as exemplary only, with a true scope of the specification being indicated by the following claims.

What is claimed is:

1. A life indicator for a component of a machine, the life indicator comprising:

a plurality of sensors operably associated with the machine, each sensor being configured to sense a property associated with the machine and output the sensed property as data signals;

a memory element including an engine data structure;

a processor for executing the engine data structure to determine engine output torque of the machine based on at least a first data signal;

the memory element further including a lower drive data structure, the processor being configured to process the lower drive data structure to determine a transmission output torque of the machine based on at least the engine output torque and at least a second data signal, the memory element further including a damage factor data structure, the processor being configured to determine a damage factor based on at least the transmission output torque and at least a third data signal, the memory element further including a final drive life data structure, the processor being configured to process the final drive life data structure to estimate an actual work life of the component based on at least the damage factor; and a display configured to show the actual work life of the machine component, wherein the display is further configured to show a maintenance status, the maintenance status indicating that service of the component is required when a determined percentage of a designed component life is used.

2. The life indicator of claim 1, wherein the damage factor is expressed as damage units.

3. The life indicator of claim 2, wherein the display is configured to display the damage units in real-time.

4. The life indicator of claim 1, wherein the memory element includes designed component life data and wherein the processor is configured to compare the damage factor to the designed component life data to estimate the actual work life of the component of the machine.

5. The life indicator of claim 1, further including a communication port associated with the processor and configured to communicate with a service tool.

6. The life indicator of claim 1, further including a transmitter associated with the processor, the transmitter being configured to transmit a signal indicative of the damage factor; and a receiver disposed remote from the machine for receiving the transmitted signal.

7. A life indicator for a component of a machine, the life indicator comprising:

a plurality of sensors operably associated with the machine, each sensor being configured to sense a property associated with the machine and output the sensed property as data signals;

a memory element including a data structure that determines a damage factor of the component of a machine based at least in part on data signals received from the plurality of sensors, the memory element further including designed component life data;

a processor configured to execute the data structure to determine the damage factor, wherein the memory element further includes an engine data structure and the processor is configured to execute the engine data structure to determine engine output torque based on at least a first data signal, the memory element further including a lower drive data structure, the processor being configured to process the lower drive data structure to determine a transmission output torque of the machine based on at least the engine output torque and at least a second data signal, the memory element further including a damage factor data structure, the processor being configured to determine the damage factor based on at least the transmission output torque and at least a third data signal, and the memory element further including a final drive life data structure, the processor being configured to process the final drive life data structure to estimate an actual work life of the component based on a comparison of the damage factor to the designed component life data; and a display configured to show the actual work life of the machine component, wherein the display is further configured to show a maintenance status, the maintenance status indicating that service of the component is required when a determined percentage of a designed component life is used.

8. The life indicator of claim 7, wherein the actual work life is displayed as a percentage of life used, a percentage of life remaining, or hours of usage remaining.

9. The life indicator of claim 7, wherein the display is a dash display in a cab of the machine.

10. The life indicator of claim 7, wherein the display is further configured to show at least one of a time, a period, a location, and a damage level when the damage factor exceeds a designated level.

11. The life indicator of claim 7, wherein the plurality of sensors includes at least one of the following: a gear code sensor, a transmission output speed sensor, and a differential oil temperature sensor.

12. A method of monitoring the effect of operating conditions on a component of a machine, the method comprising:

sensing at least one property associated with the machine;

maintaining a data structure in a memory element that determines a damage factor indicative of an instantaneous stress applied to the component based at least in part on the at least one property; and processing the data structure to determine the damage factor based on the at least one property;

displaying the damage factor in a cab of the machine;

displaying at least one of: a time, a period, a location, and a damage level when the damage factor exceeds a designated level; and estimating a work life of the component based on the damage factor, wherein the data structure includes an engine data structure, a lower drive data structure, a damage factor data structure, and a final drive life data structure, and wherein processing the data structure includes:

processing the engine data structure to determine engine output torque of the machine based on at least a first data signal, processing the lower drive data structure to determine a transmission output torque of the machine based on at least the engine output torque and at least a second data signal, processing the damage factor data structure to determine the damage factor based on at least the transmission output torque and at least a third data signal, and processing the final drive life data structure to estimate the work life of the component based on at least the damage factor.

13. The method of claim 12, wherein the displaying the damage factor step includes activating at least one of a visible or audible indicator when the damage factor exceeds a threshold.

14. A method of monitoring the effect of operating conditions on a component of a machine, the method comprising:

sensing at least one property associated with the machine;

maintaining a data structure in a memory element that determines a damage factor of the component based at least in part on the at least one property; and processing the data structure to determine the damage factor based on the at least one property;

transferring damage factor information from the memory element into a database that contains damage factor information on a plurality of machines; and comparing the information from each machine to prioritize machine maintenance of the plurality of machines, wherein the data structure includes an engine data structure, a lower drive data structure, a damage factor data structure, and a final drive life data structure, and wherein processing the data structure includes:

processing the engine data structure to determine engine output torque of the machine based on at least a first data signal, processing the lower drive data structure to determine a transmission output torque of the machine based on at least the engine output torque and at least a second data signal, processing the damage factor data structure to determine the damage factor based on at least the transmission output torque and at least a third data signal, and processing the final drive life data structure to estimate a work life of the component based on at least the damage factor.

15. The method of claim 14, wherein the method further includes:

maintaining designed component life data in the memory element; and comparing the damage factor to the designed component life data to estimate the actual work life of the component.

16. The method of claim 15, wherein the method further includes displaying the actual work life of the component as at least one of a percentage of life used, a percentage of design life remaining, or hours of usage remaining.

17. The method of claim 15, further including determining that service of the component is required when a designated percentage of the actual work life remains.

18. The method of claim 14, further including transferring the damage factor into a servicing tool or a central processing computer, the servicing tool or central processing computer communicating with the processor through a communication port.

19. The method of claim 18, wherein the communication port is a wireless modem.

20. The method of claim 18, further including identifying a component requiring maintenance.

21. The method of claim 14, further including assessing the damage factor to determine high use stresses; and changing operator behavior to reduce the impact of the high use stresses.

22. The method of claim 14, further including assessing the damage factor to determine high use stresses; and altering the high use stresses to reduce the impact of the high use stresses on the damage factor.

23. The method of claim 14, further including determining the impact of use stresses on the damage factor; and considering the impact of the use stresses on the component of the machine in pricing a service contract.

24. The method of claim 14, further including monitoring the damage factor on the component of the machine for a designated period of time; and developing the service contract based on the damage factor.

25. A life indicator of a component of a machine, the life indicator comprising:

a plurality of sensors operably associated with the machine, each sensor being configured to sense a property of the machine and output the sensed property as data signals;

a computer system including a memory component containing an engine data structure and a processor for executing the engine data structure to determine engine output torque of the machine based on at least a first data signal;

the memory component of the computer system further containing a lower drive data structure, the processor being configured to process the lower drive data structure to determine a transmission output torque of the machine based on at least the engine output torque and at least a second data signal, the memory component of the computer system further containing a damage factor data structure, the processor being configured to determine a damage factor based on at least the transmission output torque and at least a third data signal;

the memory component of the computer system further containing a final drive life data structure, the processor being configured to process the final drive life data structure to estimate an actual work life of the component based on at least the damage factor.

26. The life indicator of claim 25, wherein the first data signal is provided by one or more of an atmospheric pressure sensor, a fuel flow sensor, a boost pressure sensor, a water temperature sensor, and an engine speed sensor, wherein the second data signal is provided by one or more of a gear code sensor and a transmission speed sensor, and wherein the third data signal is provided by at least an oil temperature sensor.

27. A method of monitoring the effect of operating conditions on a component of a machine, the method comprising:

sensing at least one property associated with the machine;

maintaining a data structure in a memory element that determines a damage factor indicative of an instantaneous stress applied to the component based at least in part on the at least one property; and processing the data structure to determine the damage factor based on the at least one property;

displaying at least one of: a time, a period, a location, and a damage level when the damage factor exceeds a designated level; and estimating a work life of the component based on the damage factor, wherein the data structure includes an engine data structure, a lower drive data structure, a damage factor data structure, and a final drive life data structure, and wherein processing the data structure includes:

processing the engine data structure to determine engine output torque of the machine based on at least a first data signal, processing the lower drive data structure to determine a transmission output torque of the machine based on at least the engine output torque and at least a second data signal, processing the damage factor data structure to determine the damage factor based on at least the transmission output torque and at least a third data signal, and processing the final drive life data structure to estimate the work life of the component based on at least the damage factor.

28. The method of claim 27, further including assessing the damage factor to determine high use stresses; and changing operator behavior to reduce the impact of the high use stresses.

29. The method of claim 27, further including assessing the damage factor to determine high use stresses; and altering the high use stresses to reduce the impact of the high use stresses on the damage factor.

30. The method of claim 27, further including determining the impact of use stresses on the damage factor; and considering the impact of the use stresses on the component of the machine in pricing a service contract.

31. The method of claim 27, further including monitoring the damage factor on the component of the machine for a designated period of time; and developing the service contract based on the damage factor.

* * * * *